(12) United States Patent
Jenny et al.

(10) Patent No.: US 10,112,577 B2
(45) Date of Patent: Oct. 30, 2018

(54) AUTOMATIC SEAT BELT RETRACTOR

(71) Applicant: GM GLOBAL TECHNOLOGY OPERATIONS LLC, Detroit, MI (US)

(72) Inventors: Thomas Jenny, Ruesselsheim (DE); Juergen Maier, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/625,569

(22) Filed: Jun. 16, 2017

(65) Prior Publication Data
US 2017/0361804 A1   Dec. 21, 2017

(30) Foreign Application Priority Data

Jun. 16, 2016 (DE) ........................ 10 2016 007 375

(51) Int. Cl.
| | | |
|---|---|---|
| *B60R 22/34* | (2006.01) | |
| *B60R 22/48* | (2006.01) | |
| *B60R 22/46* | (2006.01) | |
| *B60R 21/01* | (2006.01) | |

(52) U.S. Cl.
CPC .............. *B60R 22/48* (2013.01); *B60R 22/46* (2013.01); *B60R 2022/4808* (2013.01)

(58) Field of Classification Search
CPC ......... B60R 22/34; B60R 22/38; B60R 21/01; B60R 22/46
USPC ......................................................... 701/45
See application file for complete search history.

(56) References Cited

U.S. PATENT DOCUMENTS

| | | | |
|---|---|---|---|
| 6,213,510 B1 | 4/2001 | Suyama | |
| 6,447,012 B2 | 9/2002 | Peter et al. | |
| 6,726,249 B2 * | 4/2004 | Yano | B60R 22/46 |
| | | | 180/268 |
| 9,254,818 B2 | 2/2016 | Vitet | |
| 2006/0255583 A1 * | 11/2006 | Lenning (Ingemarsson) | |
| | | | B60R 22/28 |
| | | | 280/805 |
| 2007/0145175 A1 * | 6/2007 | Clute | B60R 22/341 |
| | | | 242/379.1 |
| 2008/0319617 A1 | 12/2008 | Takemura | |
| 2009/0005935 A1 * | 1/2009 | Lenning | B60R 22/28 |
| | | | 701/45 |

(Continued)

FOREIGN PATENT DOCUMENTS

| | | |
|---|---|---|
| CN | 204323280 U | 5/2015 |
| DE | 102005014521 A1 | 10/2006 |

(Continued)

OTHER PUBLICATIONS

German Patent and Trade Mark Office, German Search Report for German Patent Application No. 10 2016 007 375.6, dated Apr. 24, 2017.

*Primary Examiner* — Tan Q Nguyen

(74) *Attorney, Agent, or Firm* — Lorenz & Kopf, LLP

(57) ABSTRACT

An automatic seat belt retractor includes a belt reel configured to wind a seat belt and a sensor configured to permanently record a rotational speed of the belt reel. The sensor cooperates with an element that is speed-coupled to the belt reel to record the rotational speed. The automatic seat belt retractor includes a brake unit configured to decelerate the seat belt being unwound from the belt reel with a restraining force and a control module configured to control the brake unit with respect to the restraining force as a function of the rotational speed.

16 Claims, 2 Drawing Sheets

(56) References Cited

U.S. PATENT DOCUMENTS

2014/0061353 A1* 3/2014 Vitet .................. B60R 22/4676
242/379.1

FOREIGN PATENT DOCUMENTS

| | | |
|---|---|---|
| DE | 102006006795 A1 | 8/2007 |
| DE | 102007017375 A1 | 10/2008 |
| DE | 102008009040 A1 | 8/2009 |
| DE | 102013004784 A1 | 9/2014 |
| DE | 102013011267 A1 | 1/2015 |
| KR | 100681174 B1 | 2/2007 |

* cited by examiner

AUTOMATIC SEAT BELT RETRACTOR

CROSS-REFERENCE TO RELATED APPLICATION

This application claims priority to German Patent Application No. 102016007375.6, filed Jun. 16, 2016, which is incorporated herein by reference in its entirety.

TECHNICAL FIELD

The present disclosure pertains to an automatic seat belt retractor.

BACKGROUND

Motor vehicles typically feature seat belts for protecting the occupants in case of an accident. In this respect, it is common practice to use automatic seat belts that are retracted when they are not in use. A so-called automatic seat belt retractor serves for realizing the retraction.

DE 10 2013 004 784 A1 discloses an automatic seat belt retractor. The seat belt retractor is provided with a retractor shaft and a device for determining the rotational speed and/or the rotational angle of the retractor shaft, a rotating magnetic element, a stationary magnetic field sensor and a magnetic flux-conducting stationary element between the rotating magnetic element and the magnetic field sensor. Information on the rotational angle of the retractor shaft is required for certain functions of seat belt retractors, particularly seat belt tensioners. This information is required, for example, for detecting the Out-Of-Position situation, for monitoring and controlling the rotational speed of the motor for driving the tensioner or a prelensioner or for controlling the tensioning process itself.

SUMMARY

The present disclosure provides an improved automatic seat belt retractor.

The automatic seat belt retractor includes a belt reel. The belt reel serves for winding the seat belt. In this context, "winding" means that the seat belt can be wound up on the belt reel, as well as unwound therefrom. The automatic seat belt retractor includes a sensor. The sensor serves for permanently recording the rotational speed of the belt reel. The sensor or its capability to record the rotational speed is therefore permanently coupled to the belt reel—as long as the sensor is in operation, e.g. supplied with electrical energy. Consequently, the sensor always records the current rotational speed of the belt reel. In this context, the "rotational speed of the belt reel" should be interpreted as a value that is positively correlated with the belt extraction or the belt extraction speed, respectively. This may concern the physical rotational speed of the reel, but also a related rotational speed that has a known relation to the rotational speed of the reel, e.g. a certain transmission ratio. The rotational speed is recorded directly or in accordance with a transmission ratio. It is therefore impossible for the belt reel to carry out a rotation that is not detected by the sensor. However, this excludes motions below the detection threshold of the sensor. The sensor for recording the rotational speed cooperates with at least one element that is speed-coupled to the belt reel. The sensor therefore records the rotational speed directly on the belt reel or on an element that is speed-coupled to the belt reel. In this case, the element may have a rotational speed that is identical to the rotational speed of the belt reel, but also a different rotational speed, from which the rotational speed of the belt reel can be positively determined or calculated.

The automatic seat belt retractor includes a brake unit, for example, in the form of a torsion rod that is located within the belt reel and connected thereto in a form-fitting fashion, e.g. by a certain profile. The brake unit serves for respectively lowering the further belt restraining force level or decelerating the seat belt after it has been tensioned and its extraction has been blocked, namely in a biomechanically compatible fashion for the occupant. The deceleration takes place with a restraining force that is preadjusted, e.g., by the torsion rod. The seat belt therefore can only be unwound from the belt reel by pulling on the seat belt with a force greater than, the restraining force that can be transmitted by the torsion rod. Consequently, a deceleration of the belt retraction, which is controlled with respect to the restraining force, is realized with the aid of the brake unit. The deceleration is particularly realized mechanically by the torsion rod, wherein an automatic seat belt retractor may also feature two torsion rods and be activated pyrotechnically. In this context, a stronger "deceleration" refers to a respective increase of the belt restraining force level or the restraining force in comparison with an instance, in which the belt can be extracted with less force.

A corresponding extraction takes place in an accident situation. In this context, the "deceleration" should be interpreted in such a way that the belt is neither completely blocked nor extractable with hardly any force as it is the case during its normal operation, e.g. when the seat belt is fastened, but rather only by overcoming the comparatively increased restraining force.

The automatic seat belt retractor includes a control module that serves for controlling the brake unit with respect to the restraining force. The control module particularly serves for controlling the restraining force as a function of the rotational speed.

The automatic seat belt retractor particularly includes an electronic transmission channel between the sensor and the control module to transmit the rotational speed between these two components.

According to the present disclosure, this provides the advantage that the restraining force can be controlled such that it is individually adapted to a certain accident situation or corresponding accident dynamics including the person to be secured with the seat belt. Depending on the circumstances of the accident, different rotational speeds or rotational speed profiles of the belt reel occur when the seat belt is stressed by the person to be secured during the accident. According to the present disclosure, a brake unit is provided and can be controlled with respect to its restraining force as a function of the rotational speed.

In a preferred embodiment, the speed-coupled element is a torsion rod that is connected to the belt reel or a connected connector or adapter part. These parts have the same rotational speed as the belt reel or at least a rotational speed that is positively correlated with the rotational speed of the belt reel. In this context, "connected" particularly refers to engaging or form-fitting or non-positive connections, etc. The belt reel particularly features a flange for being connected to the element.

In a preferred embodiment, the sensor is an absolute sensor that serves for delivering information on the absolute belt extraction. The sensor signal can preferably also deliver information on the absolute belt extraction (total length of the unwound belt section) by a corresponding coding. The sensor may be in a so-called sleep mode, e.g., while the motor vehicle is at a standstill and in the state "ignition off." It can be "awakened" when the seat belt is extracted (wake-up mode), e.g., to obtain information on the initial belt extraction length based on the number of belt reel revolutions.

In a preferred embodiment of the present disclosure, the belt reel is rotatably mounted in a housing and the sensor is installed on the housing. Since the sensor itself does not have to be rotatably mounted, its installation, as well as its signaling connection and—in case of an electric or electronic sensor—its electrical connection, can be realized in a particularly simple fashion.

In a preferred variation of this embodiment, the belt reel—particularly with the belt wound up thereon—is rotatably mounted in the housing, i.e. in the automatic seat belt retractor housing. The belt reel therefore serves for accommodating or winding up the belt and particularly—if applicable—for transmitting the belt extraction forces to the torsion rod, which is mounted in the reel and connected thereto in a form-fitting fashion. The automatic seat belt retractor features a rotary part, namely a rotary encoder. The rotary part is connected in a rotationally rigid fashion to the belt reel or—if applicable—to the speed-coupled element, particularly the torsion rod or a connector part that rotates with the same rotational speed as the belt reel or the torsion rod and is referred to as shaft below, and serves for interacting with the sensor to determine the rotational speed. The rotary part and the sensor jointly form a sensor system. The term "rotationally rigid" connection means that each rotation of the shaft leads to a rotation of the rotary part.

The rotary part, e.g. in the form of a multiple north-south encoder or in the form of a toothed wheel disk, may then be simply realized in the form of a passive component. "Passive" means that the component is not actively supplied with energy electrically or otherwise and/or does not require any wiring, cabling, supply lines, etc. Accordingly, it can be easily arranged on the shaft such that a cost-efficient and simple rotational speed sensor is realized.

In an alternative embodiment, the rotary part, particularly in the form of the encoder, may also be directly sewn in or on the belt strap.

In a preferred variation of this embodiment, the rotary part is arranged directly on the shaft or—if applicable—on the speed-coupled element and/or represents an integral component of the shaft or—if applicable—the speed-coupled element. The rotary part is arranged, e.g., directly on the end face of the shaft, particularly in the form of a round rotary part that is arranged concentric to the shaft. For example, the shaft is realized in the form of a rotary part at a corresponding location.

In another variation of this embodiment, the rotary part is realized in the form of a passive rotational speed profile. The sensor is an electronic sensor. The rotational speed profile therefore only provides information that can be picked up by the sensor to respectively determine the rotational speed or generate rotational speed-dependent signals and, in particular, to respectively process or transform these signals before they are forwarded to a control unit.

In a preferred embodiment, the sensor is a contactless active sensor that operates based on galvanomagnetic effects MALL, magnetically resistive) and/or an electro-optic functional principle. In this way, any frictional losses and corresponding wear within the sensor system are avoided.

The basic principle of corresponding rotational speed sensor systems is well known and therefore can be easily realized.

In a preferred embodiment, the control module serves for controlling the restraining force profile as a function of the time. In a "profile as a function of the time," it should at least be possible to vary the restraining force as a function of the time. The actual profile depends on the determined rotational speeds and the corresponding control and may be constant and/or vary as a function of the time.

According to this embodiment; it is particularly if possible to realize the following scenario: it is assumed that the automatic seat belt retractor is installed in a vehicle, that a passenger is secured with the seat belt and that the vehicle is involved in an accident. In this case, an accident characteristic can be determined based on the time-related rotational speed profile measured by the sensor and it is possible to dynamically or at least individually react to the course of the accident accordingly by varying the restraining force as a function of the time. The dynamic adaptation may take place continuously over the entire course of the accident.

In a preferred embodiment, the control module serves for adapting the profile to a determined accident severity and/or to the weight of a vehicle passenger secured with the seat belt. In this case, it is also assumed that the automatic seat belt retractor is installed in a vehicle, that a passenger is secured with the seat belt and that the vehicle is involved in an accident. Parameters for an accident severity and/or the weight of the passenger are made available to the control module, e.g., via input interfaces and/or parameters. In this way, a particularly individual adaptation of the restraining force to the instantaneous situation is realized, e.g. by a pyrotechnically operated actuator integrated in or on the automatic seat belt retractor.

In a preferred variation, the control module is designed for determining the corresponding accident severity and/or the weight or occupant weight or weight differences from the rotational speed profile. This variation is based on the following considerations: the accident leads to an extraction of the seat belt, wherein the accident severity or the weight of the passenger involved in the accident affect the rotational speed characteristic. Consequently, these parameters can be deduced from the rotational speed characteristic by suitable inverse methods. The above-described input interfaces are not required in this case.

Other sensor signals available in the vehicle such as the vehicle speed, the longitudinal or lateral acceleration and the yaw rate may alternatively or additionally be used by the control module as input variables for controlling the actuator system (at identical vehicle decelerations, different occupant masses lead to different belt extraction speeds or belt extraction accelerations, i.e. the measurement, e.g., of the rotational speed of the belt reel makes it possible to calculate the occupant weight with the aid of a suitable evaluation algorithm).

In a preferred embodiment, the control module serves for limiting the restraining force. An upper limit for the corresponding restraining force is therefore defined at any time during an accident such that a correspondingly secured passenger always is only subjected to the corresponding restraining force of the seat belt to thereby prevent or reduce injuries to the secured person by the seat belt or an excessively high restraining force thereof, respectively.

In a preferred embodiment, the control module serves for increasing the restraining force (strategy-dependent), for example, to prevent or diminish the impact of larger occupants on the rear side of the front seat backrest.

In a preferred embodiment, the automatic seat belt retractor features a weight sensor system. In addition to the rotational speed signal of the automatic seat belt retractor, the weight sensor system is also used for controlling the automatic seat belt retractor or an actuator thereof in this case. The weight sensor system serves for respectively determining or validating the weight of a person secured with the seat belt. The weight sensor system includes an element that is connected to the control unit of the automatic seat belt retractor and arranged distant from the automatic seat belt retractor. For example, the weight sensor system may be realized in the form of a mat that can be installed into a seating surface of a seat, to which the automatic seat belt retractor is assigned. The determined weight can be used for controlling the restraining force to individually adapt this restraining force to a passenger weight.

Embodiments of the present disclosure, namely also in the form of combinations of the above-described embodiments or, if applicable, embodiments that were not described so far, are summarized as follows:

The present disclosure proposes an automatic seat belt retractor with a rotational speed sensor and a restraining force level, which can be time-variably controlled. The present disclosure also proposes an automatic seat belt retractor with an integrated rotational speed sensor, which measures the rotational speed of the belt reel of the automatic seat belt retractor, potentially transforms this rotational speed into a voltage signal and forwards this voltage signal to a control unit in the form of an input signal for further processing and analysis. It is decided if and when an output signal for activating the actuator should be transmitted based on an algorithm and stored decision criteria. If the actuator is triggered during an accident, the belt restraining force can be increased or decreased depending on the accident severity, the occupant weight or the initial setting of the belt restraining force by controlling the actuator system accordingly to thereby prevent the stresses for the vehicle occupant secured with the seat belt from increasing excessively.

During an accident, the belt reel accelerates and the controlled restraining force allows the belt extraction to take place in a defined fashion. In this phase of an accident, the rotational speed of the belt reel is determined by a rotational speed sensor system arranged in or on the automatic seat belt retractor and transmitted to a control unit (control module) for analysis. The restraining force level is then adapted depending on the accident severity and the specific extraction characteristic by an actuator system integrated into the automatic seat belt retractor. The belt restraining force level is advantageously adapted to the accident severity and to the occupant weight to reduce the level of injuries. Consequently, a cost-efficient rotational speed sensor system is utilized rather than a weight sensor system.

According to the present disclosure, a time-variable adaptation of the belt restraining force level with consideration of the belt extraction speed and the accident severity is realized by a fast rotational speed sensor system, which is cost-efficiently integrated into the belt retractor (automatic seat belt retractor/belt reel).

A weight sensor system is alternatively or additionally integrated into the seat.

The present disclosure proposes a rotational speed sensor or sensor system with integrated rotational speed profile (encoder), which is arranged on or at least motion-coupled to the rotating belt reel, and with an electronic rotational speed sensor system or sensor, which is coupled to the stationary belt housing. The rotational speed sensor system preferably operates in a contactless fashion, for example according to the electromagnetic or electro-optic functional principle. The present disclosure optionally proposes a rotational speed sensor with an additional actuator system that is integrated into the automatic seat belt retractor and serves for respectively decelerating the belt extraction or increasing the belt restraining force level. The actuator system preferably is realized pyrotechnically.

The present disclosure optionally proposes a rotational speed sensor with electric transmission of the reel speed (rotational speed of the belt reel) to a control unit (control module), which analyzes the signal in connection with the accident severity by an algorithm and activates the actuator system by an output signal in a correspondingly time-adapted fashion.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
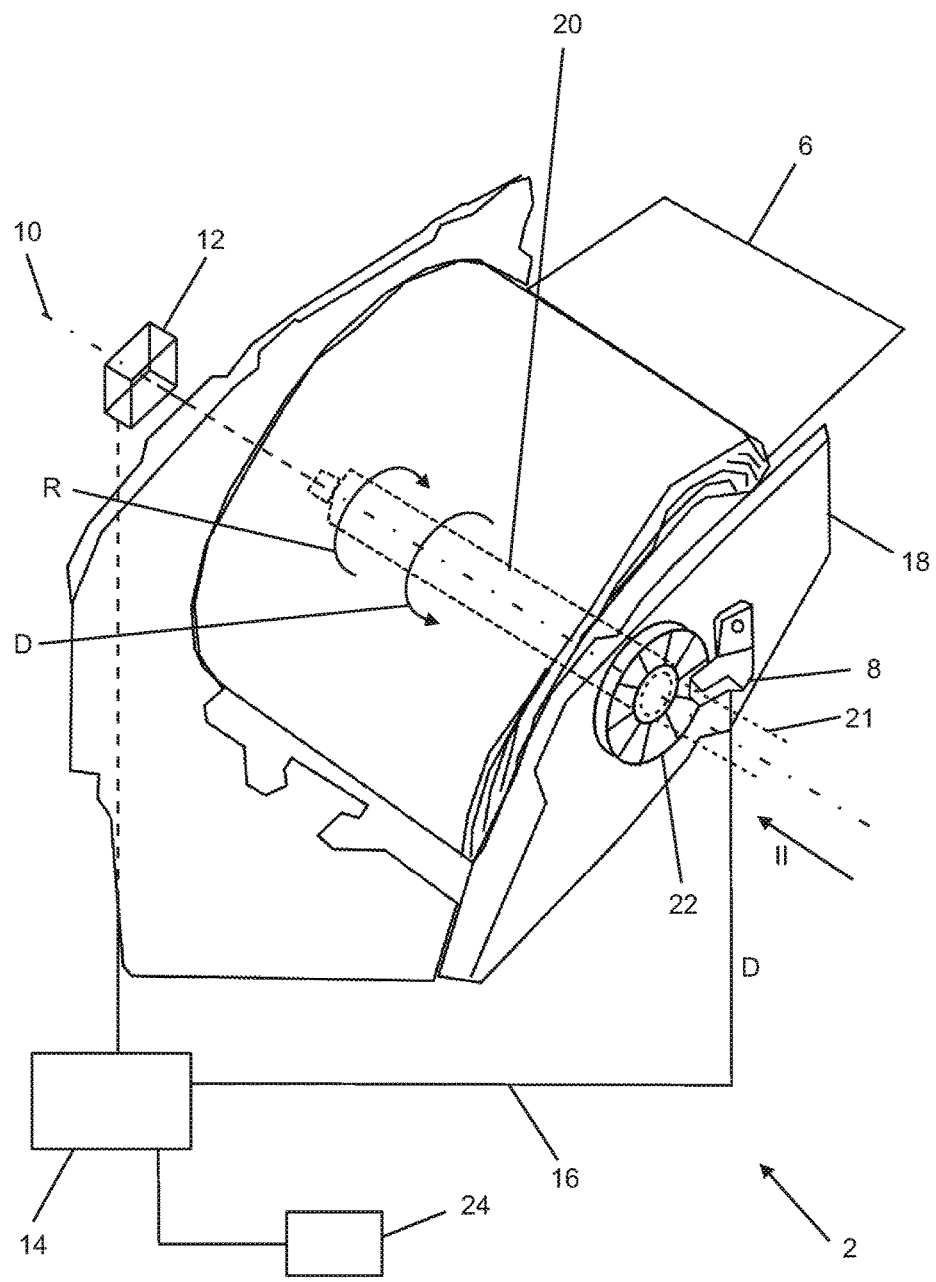
FIG. 1 shows an automatic seat belt retractor in the form of a perspective representation.
Figure 2:
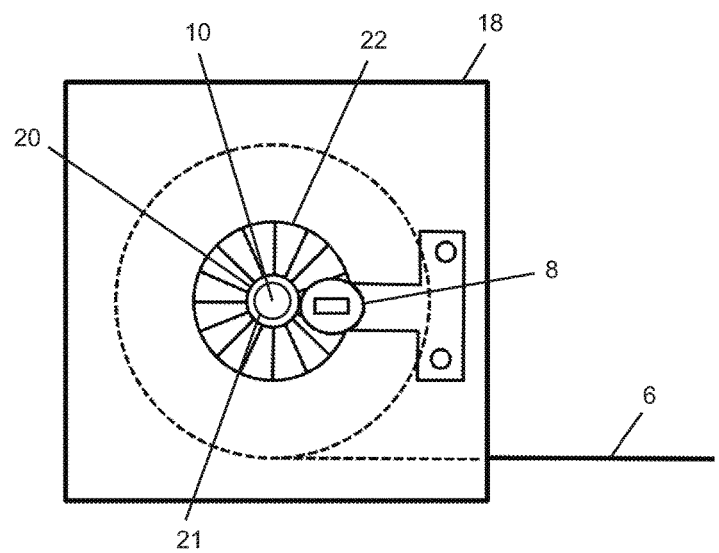
FIG. 2 shows a side view of the automatic seat belt retractor according to FIG. 1 in the direction of the arrow II.

FIG. 1 shows an automatic seat belt retractor 2 that includes a belt reel 20. The belt reel 20 serves for winding up and unwinding a seat belt 6. The automatic seat belt retractor 2 includes a sensor 8 that serves for recording a rotational speed D of the belt reel 4 about a rotational axis 10. In FIG. 1, the rotational speed D is symbolically indicated in the form of a rotational arrow of the belt reel 28, wherein the rotation in the direction of the arrow takes place when the seat belt 6 is unwound from the belt reel 20. The sensor 8 permanently records the rotational speed D—as long as it is in operation—i.e. any rotation of the belt reel 20 about its rotational axis 10, which lies within the measuring capabilities of the sensor 8, is always detected by the sensor 8.

The automatic seat belt retractor 2 is installed into a not-shown vehicle, in this case an automobile, and assigned to a not-shown vehicle seat thereof. A not-shown person is seated on the vehicle seat and secured with the seat belt 6.

A brake unit 12, which only is symbolically indicated in FIG. 1, serves for decelerating the seat belt 6 being unwound from the belt reel 20. The deceleration is realized by respectively applying a restraining force R to the seat belt 6 or the belt reel 20 as indicated with an arrow about the rotational axis 10 in FIG. 1. The automatic seat belt retractor 2 includes a control module 14 that serves for controlling the brake unit 12 with respect to the restraining force R. An electronic transmission channel 16 is established between the sensor 8 and the control module 14, i.e. it connects these two components, and serves for transmitting the rotational speed D, in this case from the sensor 8 to the control module 14. The control module 14 serves for controlling the restraining force R as a function of the rotational speed D.

The belt reel 20 is mounted in a housing 18 such that it is rotatable about the rotational axis 10. The sensor 8 is arranged on the housing 18. The belt reel 20 is connected to a speed-coupled element 21, which is mounted in or on the housing 18 such that it is rotatable about the rotational axis 10. The element 21 is only symbolically indicated and consists, e.g., of a shaft, a torsion rod or a connector or adapter part. Depending on the respective design, the element 21 may rotate with the same rotational speed D as the belt reel 20 or with a different rotational speed, from which the rotational speed D of the belt reel 20 can be positively derived. The belt reel 20 serves for winding the seat belt 6, i.e. the seat belt 6 is wound up on the belt reel 20 or unwound therefrom. The torsion rod integrated into the belt reel 20 can twist under a corresponding extraction force to limit the force level and to allow the belt extraction. The automatic seat belt retractor 2 includes a rotary part 22 that is connected to the belt reel 20 in a rotationally rigid fashion. The rotary part 22 serves for cooperating with the sensor 8 to determine the rotational speed D. A rotationally rigid connection means that any rotation of the belt reel 20 leads to a rotation of the rotary part 22. The rotary part 22 is directly arranged on the belt reel 20, i.e. directly connected thereto. In an alternative embodiment, the rotary part 22 forms an integral component of the belt reel 20, i.e. the rotary part is realized integrally with the belt reel. The rotary part 22 and the belt reel 20 form one common component in this case.

In an alternative embodiment, the rotary part 22 is connected to the element 21 and records its rotational speed. The latter then is—depending on the above-described embodiment—identical to the rotational speed D of the belt reel 20 or the rotational speed D of the belt reel 20 can be positively determined or calculated therefrom.

The rotary part 22 is a passive rotational speed profile. The sensor 8 is an electronic sensor that—during its operation and within its resolution or accuracy—reacts to any rotation of the rotational speed profile to measure its rotation about the rotational axis 10. In the exemplary embodiment, the rotary part 22 includes a plurality of circumferentially arranged sectors, which are also only indicated symbolically with respect to their number, wherein the individual sectors/sector boundaries can be detected by the sensor 8. The number of sectors defines the angular resolution or measuring accuracy of the sensor system (sensor 8 and rotary part 22) and can be chosen within broad limits. For example, the sectors have a different optical design to be detectable by an optical sensor 8 or a different magnetic configuration to be detectable by a magnetic sensor 8. The sensor 8 therefore is a sensor that operates in accordance with an electromagnetic or electro-optic functional principle. In this case, both magnetic or optical sensors are electronic sensors. The sensor 8 is a contactless sensor, i.e. no direct contact between the sensor 8 and the rotary part 22 respectively exists or is required.

Figure 3:
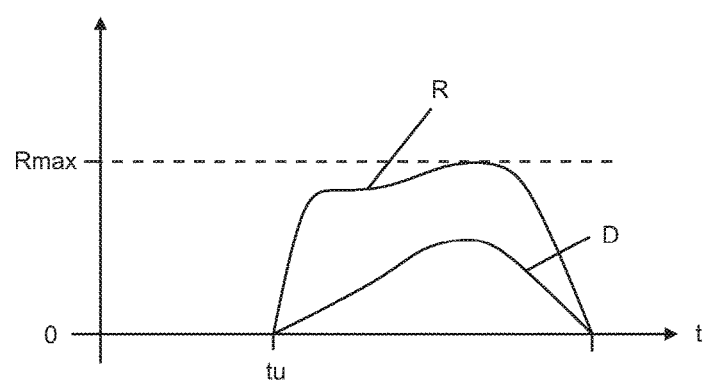
FIG. 3 shows the profiles of the rotational speed and the restraining force as a function of the time.

The control module 14 serves for controlling the restraining force R—if applicable variably—as a function of the time t. FIG. 3 shows an exemplary profile of the restraining force R as a function of the time t. A not-shown motor vehicle, into which the automatic seat belt retractor 2 is installed, is involved in an accident at the time tu, which is the reason why the restraining force IZ begins to act in this moment and initially increases gradually during the course of the accident to gradually decelerate a not-shown passenger secured with the seat belt 6 of the automatic seat belt retractor 2 during the course of the accident. The restraining force R gradually drops back to zero after the deceleration of the passenger. At this point, the accident is concluded.

The control module 14 therefore serves for controlling the profile of the restraining force R as a function of the time t. FIG. 3 shows the respective profiles of the restraining force R and the rotational speed D as a function of the time t. In this case, the control module 14 serves for adapting the profile to a determined severity of the accident and/or a weight of the person secured with the seat belt 6 as a function of the time t.

The control module 14 serves for determining the accident severity and/or the weight based on the rotational speed D or the time history of the rotational speed D over the time T.

The control module 14 also serves for limiting the restraining force R, i.e. for allowing this restraining force to increase no higher than a maximum value Rmax. This applies, for example, as an option for limiting the restraining force R.

In an alternative embodiment, the automatic seat belt retractor 2 also features a weight sensor system 24. This weight sensor system serves for determining the weight of the automobile passenger secured with the seat belt 6. For this purpose, the weight sensor system 24 is installed into the seating surface of the seat, on which the person is seated. In the exemplary embodiment, the weight sensor system 24 is connected to the control module 14 to be respectively analyzed and activated thereby.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An automatic seat belt retractor comprising:
   a belt reel configured to wind a seat belt;
   a sensor configured to permanently record a rotational speed of the belt reel, wherein the sensor cooperates with an element speed-coupled to the belt reel for recording the rotational speed;
   a brake unit configured to selectively decelerate the seat belt from being unwound in a first direction from the belt reel with a restraining force on the seat belt in a second direction opposite to the first direction; and
   a control module configured to control the brake unit such that the restraining force on the seat belt is a function of the rotational speed.

2. The automatic seat belt retractor according to claim 1, wherein the speed-coupled element comprises a torsion rod operably coupled to the belt reel.

3. The automatic seat belt retractor according to claim 1, wherein the sensor comprises an absolute sensor configured to deliver information on the absolute belt extraction.

4. The automatic seat belt retractor according to claim 1, wherein the belt reel is rotatably mounted in a housing and the sensor is arranged on the housing.

5. The automatic seat belt retractor according to claim 4, wherein the belt reel is rotatably mounted in the housing and the belt reel serves for winding the seat belt, and wherein the automatic seat belt retractor further comprises a rotary part to the belt reel in a rotationally rigid fashion and configured to cooperate with the sensor to determine the rotational speed.

6. The automatic seat belt retractor according to claim 5, wherein the rotary part is secured to a belt strap of the seat belt.

7. The automatic seat belt retractor according to claim 5, wherein the rotary part arranged on the belt reel and forms an integral component of the belt reel.

8. The automatic seat belt retractor according to claim 5, wherein the rotary part comprises a passive rotational speed profile and the sensor comprises an electronic sensor.

9. The automatic seat belt retractor according to claim 1, wherein the sensor comprises a contactless sensor.

10. The automatic seat belt retractor claim 1, wherein the control module is configured to control the profile of the restraining force as a function of the time.

11. The automatic seat belt retractor according to claim 10, wherein the control module is configured to adapt the profile to at least one of a determined accident severity and a weight of an occupant secured with the seat belt as a function of the time.

12. The automatic seat belt retractor according to claim 11, wherein the control module is configured to determine at least one of the accident severity and the occupant weight based on at least one of the rotational speed and a time history over the time.

13. The automatic seat belt retractor claim 1, wherein the control module is configured to limit the restraining force.

14. The automatic seat belt retractor according to claim 1, wherein the automatic seat belt retractor comprises a weight sensor system configured to determine the weight of an occupant to be secured with the seat belt.

15. The automatic seat belt retractor according to claim 1, wherein the restraining force on the seat belt varies as the rotational speed varies.

16. The automatic seat belt retractor according to claim 1, wherein the control module is configured to control the restraining force as a function of time based on a selected profile, the selected profile including
   an application of the restraining force and increase of the restraining force upon an initial occurrence of an accident,
   a continuance of the increase of the restraining force until a deceleration of the rotational speed, and
   upon the deceleration of the rotational speed, a decrease of the restraining force.

* * * * *